United States Patent Office 2,939,650
Patented June 7, 1960

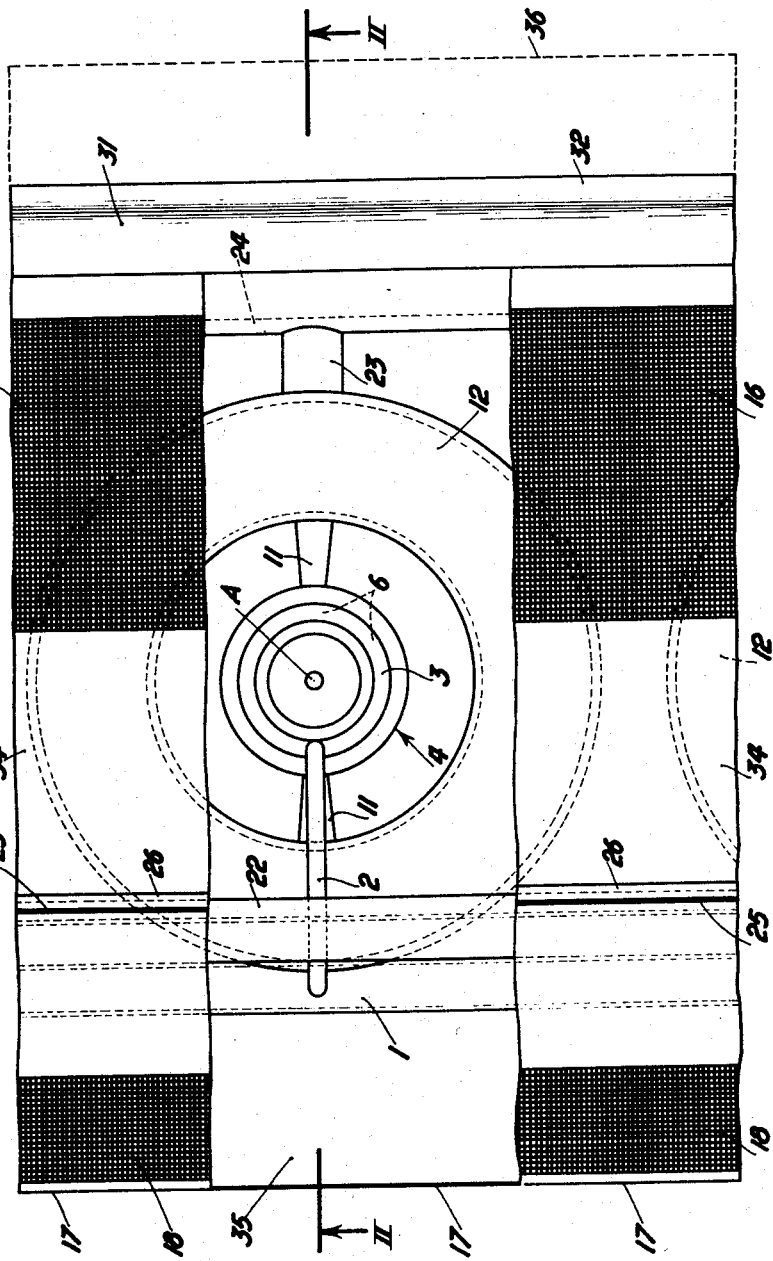

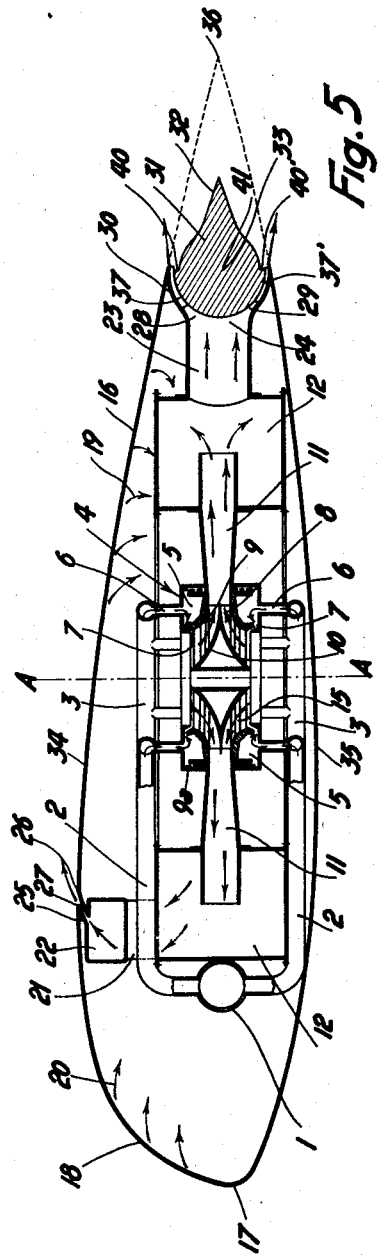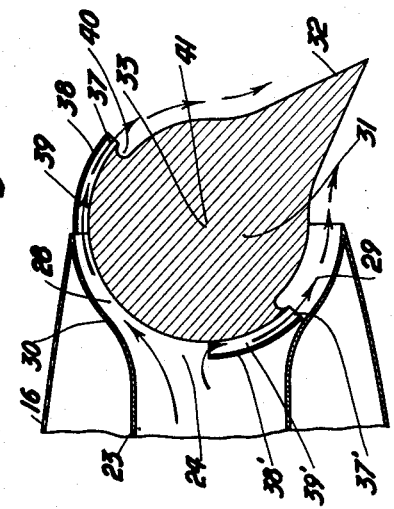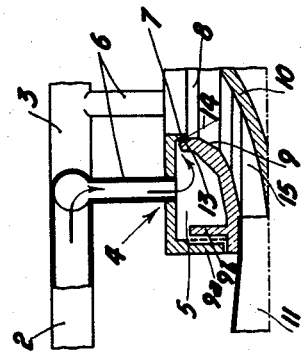

2,939,650

AIRPLANE WING WITH BOUNDARY LAYER CONTROL

Henri Coanda, Paris, France, assignor to Sebac Nouvelle S.A., Suisse, France, a corporation of France Filed Feb. 6, 1958, Ser. No. 713,620

Claims priority, application France Feb. 7, 1957

4 Claims. (Cl. 244—42)

The present invention concerns airplane wings of all types, and in particular wings which reduce head resistance and increase lift by the use of gas under pressure, which is discharged through slots pierced in the said wing.

A principal object of the present invention is to improve the aerodynamic characteristics of an airplane wing, increasing its lift to the maximum and reducing its drag as much as possible, as a result of an improved wing design.

It has already been proposed that the aerodynamic characteristics of a wing should be improved or its propulsion obtained by blowing air over the wing (air-swept wing), achieving fair efficiency in the use of energy to compress this air.

The present invention aims at obtaining, in an air-swept wing, increased efficiency in the expenditure of energy for compressing a fluid, such as air, by the construction of a wing with superior aerodynamic characteristics.

In accordance with the invention, a hypercirculation of the air around the wing is obtained by causing a flow of gas to produce simultaneously:

(1) A discharge of gas through slots which are generally spanwise (in relation to the wing) and (2) An intake of surrounding air by suction through certain areas of the extrados of the wing.

The particulars of a wing in accordance with the invention are as follows:

A system for the distribution of a compressed gas, such as compressed air, equipped with at least one static blower which sucks in the surrounding fluid;

At least one static blower;

A collector to receive the gas discharged by the one or more static blowers;

Conduits for conveying at least a part of said discharged gas to an approximately spanwise slot situated on the extrados of the wing, roughly at the point of maximum thickness of the wing, this slot is characterised by the fact that its rear lip (considered when the wing is in forward motion) is designed so that its extension progressively diverges from the direction in which the gas emerges from said slot;

And/or conduits for conveying at least a part of the said discharged gas into a longitudinal chamber situated next to the trailing edge of the wing and partially closed by a flap turning on a horizontal axis in such a way as to leave, above and below the said flap, a longitudinal passage, preferably extended towards the exterior by a series of channels emerging on a level with a longitudinal groove in the flap.

Lastly, a wall permeable to gases in the part of the extrados next to the leading edge and/or the part of the extrades next to the trailing edge.

For a better understanding of the invention, one particular application by way of example (non-restrictive) is described hereinafter. This application is represented in the annexed drawings, in which:

Fig. 1 is a plan view (from above), with a part of the extrados removed, of part of a wing in accordance with the invention;

Fig. 2 is a section through II—II of Fig. 1;

Fig. 3 represents on a larger scale the detail of a portion of the blower shown in Fig. 2;

Fig. 4 shows another detail of Fig. 2, this being the spanwise slot running along the extrados at the thickest part of the wing;

Fig. 5, finally, shows on a larger scale than in Fig. 2, another possible position of the flap at the trailing edge of the wing.

A fluid such as compressed air, coming from a compressor, not shown in the drawing, which may be of any type and mounted in the fuselage, arrives through a channel 1 running longitudinally, and is distributed through pairs of transverse conduits 2 to a collector ring 3, there being one pair of collectors 3 for each static blower 4. In actual fact, a wing usually contains a series of static blowers 4.

Each blower 4 represents a body of revolution about an axis A—A and includes:

Firstly, two toric chambers 5, fed with fluid under pressure coming from the collectors 3 through small pipes 6 and discharging this fluid under pressure through the annular slots 7 into the space 8 contained between the inside walls 9 of the chamber 5, facing towards the axis A—A, and a central piece 10;

Secondly, an intermediate conduit space 11 for expansion and compression, of the fluid from space 8. The section of means 11 in a radial half-plane containing A—A is that of a convergent-divergent nozzle or Venturi, which leads into an annular chamber or collector 12.

It may be seen from Fig. 3 that the slot 7, whose opening can be adjusted by moving in relation to each other the walls 9b and 9a of the chamber 5, is designed to bring into play the physical phenomenon known in professional circles as the "Coanda Effect" (defined below). For this reason, the wall 9, which forms the extension of one of the lips 13 of the mouth of the slot 7, progressively diverges from the axis of the exit 14 of the slot 7 (in a radial half-plane containing A—A) thus the wall 9 consists of facets (in the said radial half-plane) forming successively greater angles with the axis 14.

It is known that when the extension of one lip of the mouth of a slot, through which a gas (or a fluid) emerges under pressure, progressively diverges from the axis of the exit of the said slot, the stream of gas emerging through the slot adheres to this extended lip, creating a pressure drop or partial vacuum, and consequently a suction effect on the surrounding gas (or fluid): this is the phenomenon which constitutes the "Coanda Effect."

The space 8 communicates with the hollow interior of the wing and, when the Coanda Effect is brought into play, air is sucked in as shown by the arrows 15.

In accordance with an essential characteristic of the invention, the interior of the wing communicates with the outside atmosphere through a series of apertures or holes pierced, on the one hand, in the rear part of the wing upper surfaces (area 16), and on the other hand in that portion of the upper or top surfaces of the wing lying just behind the leading edge (area 18). The pressure drop created in the interior of the wing causes suction of the outside air through the holes in areas 16 and 18 (shown by arrows 19 and 20 respectively).

The result is that the compressed air emerging from the slots 7 sucks in the boundary layer in areas 16 and 18 and the whole of the gaseous mass (compressed air emerging from the slots 7 and air sucked in from outside through the holes in areas 16 and 18, as a result of the Coanda Effect) passes through the distributors 11 into the collectors 12. The collectors 12 communicate on the one hand, by a series of short conduits 21, with a longitudinal chamber 22, situated just under the wall of the extrados 34, and on the other hand, by a series of short conduits 23, with a longitudinal chamber 24 of roughly circular section, situated near the trailing edge 36.

The chamber 22 opens into the surrounding air through a longitudinal slot 25 which brings into play the Coanda Effect, since one of its lips is extended (wall 26) and progressively diverges from the axial plane 27 in which the compressed air emerges under pressure from the slot 25. The result is a marked reduction in pressure on the extrados, which contributes to the wing's lift and exerts suction on the air in front of the leading edge, thus diminishing the drag.

In the chamber 24 is mounted a longitudinal bar 31, roughly cylindrical but extended by a trailing edge 32 which, together with the bar, forms a flap. Between the bar 31 and the truncated rear portion 30 of the wing, there remain longitudinal passages 28 and 29.

On its upper part, the bar 31 comprises, first, a series of channels 37 running between a longitudinal wall 38 and the bar 31, partitions 39 being provided at intervals to connect the wall 38 to the bar 31, and secondly, a longitudinal recess or groove 40.

In the same way, the bar 31 comprises on its lower part, first, a series of channels 37' running between a longitudinal wall 38' and the bar 31, partitions 39' being provided at intervals to connect the wall 38' to the bar 31, and secondly, a longitudinal recess or groove 40'. The effect of the grooves 40 and 40' is to cause additional suction on the surrounding air by the compressed fluid emerging from the channels 37 and 37'.

The flap 31, 32 can be made to turn on its horizontal axis of revolution 41 which may coincide with the axis 33 of the cylinder 31 but should preferably be set off from it in such a way that passages 28 and 29 are modified during rotation of the bar 31, it being even possible for the wall 38 or 38' to reach a point where it touches the internal surface of the chamber 24.

In Fig. 2, the circulation of the gas has been indicated by arrows and the imaginary extensions of the extrados 34 and the intrados 35 which end at the imaginary trailing edge 36 of the non-truncated wing have been shown in broken lines, the flap 31—32 being shown in its normal position, whereas the position of the flap 31—32 represented in Fig. 5 corresponds to increased lift for the airplane comprising the wing herein described and represented.

Around this wing there is therefore a hypercirculation of air, for the compressed air, arriving through the conduit 1, causes in each static blower 4 an intake of additional air which is sucked from the boundary layer on the extrados through the permeable areas 16 and 18, and the total mass of air delivered by each unit 4 (compressed air from the conduit 1 plus the air sucked in) is discharged into the outside air, on one hand through the slot 25, creating a reduced pressure above the extrados, and on the other hand through the channels 37 and 37', producing a propelling thrust and/or increased or decreased lift.

The whole system contains no part whatever in rotational or alternating motion, so that it creates no vibration whatsoever in the wing.

Various alterations, improvements or additions can of course be made to the application described and represented without constituting any departure from the scope of the invention.

For example, in one variation, the collector 12 could consist of a helicoidal chamber, in which case area 11 would be equipped with fins in order to give the gas a rotational motion in that area.

Then again, in the case of thick wings, the static blower might be mounted with the axis A—A horizontal, instead of vertical as in the application represented.

What I claim is:

1. In an aircraft wing comprising, an elongated main body provided with at least an air-intake section having an air-pervious area extending spanwise on the wing adjacent a leading edge thereof and an air-pervious upper surface extending spanwise adjacent a trailing end of the wing body, a flap extending along said trailing end and having surfaces converging to form the trailing edge of the wing, means pivotally mounting the flap on said main body, blower means interiorly of the wing body having means in communication with said air-pervious upper surface defining jointly with said flap air-blast slots extending spanwise and in communication with the body interior to flow air over the converging surfaces of the flap in a direction toward said trailing edge, means cooperative with said blower means for taking a suction interiorly of the wing body, the upper surface of said wing having a slot extending spanwise for blowing air over the surface of the wing, said last-mentioned slot being disposed in a forward part of said wing, closer to the leading edge than to the trailing edge, and having in a cross-section of the wing an extended lip which continually recedes from the direction of emergence of air through said slot for flowing air over the upper surface of the wing in a direction toward the trailing edge and means providing communication between the last-mentioned slot and said blower means for providing air under pressure to said slot to cause the air under pressure to flow out of the last-mentioned slot and over the upper surface of the wing body toward the trailing edge.

2. In an aircraft wing comprising, an elongated main body provided with at least an air-intake section having an air-pervious area extending spanwise on the wing adjacent a leading edge thereof and an air-pervious upper surface extending spanwise adjacent a trailing end of the wing body, a flap extending along said trailing end and having surfaces converging to form the trailing edge of the wing, means pivotally mounting the flap on said main body, blower means interiorly of the wing body having means defining a first chamber interiorly of the wing in communication with said air-pervious upper surface, means in communication with said chamber defining jointly with said flap air-blast slots extending spanwise and in communication with said chamber to flow air over the converging surfaces of the flap in a direction toward said trailing edge, a first venturi nozzle having an inlet end in communication with the interior of the wing body, a convergent portion, a divergent portion for discharging into said first chamber and into said air-blast slots, a second venturi nozzle having an inlet end in communication with the interior of said wing body, a convergent portion, a divergent portion for discharging into said first chamber, means defining a second chamber disposed cooperative with said venturi nozzles and having a pair of circular slots each opening into a corresponding convergent portion of said venturi nozzles in the vicinity of the corresponding inlet end, means for delivering a gaseous fluid under pressure into said second chamber to cause it to flow out of said circular slots, said circular slots having in an axial section through the corresponding nozzle an extended lip which continually recedes from the direction of emergence of said compressed gaseous fluid through said circular slots, the upper surface of said wing having a slot extending spanwise for blowing air over the surface of the wing, said last-mentioned slot being disposed in a forward part of said wing closer to the leading edge than to the trailing edge and having in a cross-section of the wing an extended lip which continually recedes from the direction of emergence of air through said slot for flowing air over the upper surface of the wing in a direction toward the trailing edge, and means providing communication between the last-mentioned slot and the first chamber.

3. In an aircraft wing comprising, an elongated main body provided with at least an air-intake section having an air-pervious area extending spanwise on the wing adjacent a leading edge thereof and an air-pervious upper surface extending spanwise adjacent a trailing end of the wing body, a flap extending along said trailing end and having surfaces converging to form the trailing edge of the wing, means pivotally mounting the flap on said main body, blower means interiorly of the wing body having means defining a first chamber interiorly of the wing in communication with said air-pervious upper surface, means in communication with said chamber defining jointly with said flap air-blast slots extending spanwise and in communication with said chamber to flow air over the converging surfaces of the flap in a direction toward said trailing edge, a venturi nozzle having an inlet end in communication with the interior of the wing body, a convergent portion, a divergent portion for discharging into said first chamber and into said air-blast slots, means defining a second chamber disposed cooperative with said venturi nozzle and having a circular slot opening into the convergent portion of said venturi nozzle in the vicinity of the inlet end, means for delivering a gaseous fluid under pressure into the last-mentioned chamber to cause it to flow out of said circular slot, said circular slot having in an axial section through the corresponding nozzle an extended lip which continually recedes from the direction of emergence of said compressed gaseous fluid through said circular slot, the upper surface of said wing having a slot extending spanwise for blowing air over the surface of the wing, said last-mentioned slot being disposed in a forward part of said wing and having in a cross-section of the wing an extended lip which continually recedes from the direction of emergence of air through said slot for flowing air over the upper surface of the wing in a direction toward the trailing edge, and means in communication with said first chamber for providing gaseous fluid under pressure to the last-mentioned slot.

4. In an aircraft wing comprising, an elongated main body provided with at least an air-intake section having an air-pervious area extending spanwise on the wing adjacent a leading edge thereof and an air-pervious upper surface extending spanwise adjacent a trailing end of the wing body, a flap extending along said trailing end and having surfaces converging to form the trailing edge of the wing, means pivotally mounting the flap on said main body, blower means interiorly of the wing body having means defining a first chamber interiorly of the wing in communication with said air-pervious upper surface, means in communication with said chamber defining jointly with said flap air-blast slots in communication with said chamber to flow air over the converging surfaces of the flap in a direction toward said trailing edge, a venturi nozzle having an inlet end in communication with the interior of said wing body, a convergent portion, a divergent portion for discharging into said first chamber, means defining a second chamber disposed cooperative with said venturi nozzle and having a circular slot opening into a corresponding convergent portion of said venturi nozzle in the vicinity of the inlet end, means for delivering a gaseous fluid under pressure into the last-mentioned chamber to cause it to flow out of said circular slot, said circular slot having in an axial section through the corresponding nozzle an extended lip which continually recedes from the direction of emergence of said compressed fluid through said circular slot, the upper surface of said wing having a slot extending spanwise for blowing air over the surface of the wing, said last-mentioned slot being disposed in a forward part of said wing closer to the leading edge than to the trailing edge and having in a cross-section of the wing an extended lip which continually recedes from the direction of emergence of air through said slot for flowing air over the upper surface of the wing in a direction toward the trailing edge, and means providing communication between the last-mentioned slot and the first chamber.

References Cited in the file of this patent

UNITED STATES PATENTS 2,585,676    Poisson-Quinton    Feb. 12, 1952